US010598188B2

(12) United States Patent
Weisbrod et al.

(10) Patent No.: US 10,598,188 B2
(45) Date of Patent: Mar. 24, 2020

(54) RADIAL COMPRESSOR AND TURBOCHARGER

(71) Applicant: MAN Diesel & Turbo SE, Augsburg (DE)

(72) Inventors: Tobias Weisbrod, Augsburg (DE); Harald Denkel, Baar (DE); Matthias Glathe, Obergriesbach (DE)

(73) Assignee: MAN Energy Solutions SE, Augsburg (DE)

(*) Notice: Subject to any disclaimer, the term of this patent is extended or adjusted under 35 U.S.C. 154(b) by 62 days.

(21) Appl. No.: 15/807,086

(22) Filed: Nov. 8, 2017

(65) Prior Publication Data
US 2018/0172021 A1 Jun. 21, 2018

(30) Foreign Application Priority Data

Dec. 21, 2016 (DE) .................. 10 2016 125 143

(51) Int. Cl.
F04D 29/44 (2006.01)
F04D 29/42 (2006.01)
F04D 29/68 (2006.01)
F04D 29/62 (2006.01)
F02C 6/12 (2006.01)
F04D 29/28 (2006.01)

(52) U.S. Cl.
CPC .............. F04D 29/441 (2013.01); F02C 6/12 (2013.01); F04D 29/284 (2013.01); F04D 29/4213 (2013.01); F04D 29/624 (2013.01); F04D 29/685 (2013.01); F05D 2220/40 (2013.01); F05D 2230/53 (2013.01); F05D 2250/51 (2013.01); F05D 2250/52 (2013.01)

(58) Field of Classification Search
CPC .... F04D 29/441; F04D 29/685; F04D 29/624; F04D 29/4213; F04D 29/284; F02C 6/12; F05D 2230/53; F05D 2250/51; F05D 2250/52; F05D 2220/40
USPC .......................... 415/224.5; 60/605.1, 605.2
See application file for complete search history.

(56) References Cited

U.S. PATENT DOCUMENTS

| 2,874,642 | A | * | 2/1959 | Forrest | F04D 15/0033 |
| | | | | | 415/52.1 |
| 3,173,241 | A | * | 3/1965 | Birmann | F01D 17/146 |
| | | | | | 415/204 |
| 3,251,539 | A | * | 5/1966 | Wolfe | F04D 29/462 |
| | | | | | 415/150 |
| 4,521,155 | A | * | 6/1985 | Osborn | F04D 25/04 |
| | | | | | 415/190 |
| 7,862,298 | B2 | * | 1/2011 | Cvjeticanin | F04D 29/023 |
| | | | | | 415/215.1 |

(Continued)

FOREIGN PATENT DOCUMENTS

EP 1 340 920 A1 9/2003

Primary Examiner — Hoang M Nguyen
(74) Attorney, Agent, or Firm — Cozen O'Connor

(57) ABSTRACT

A radial compressor (10), with a compressor rotor having moving blades and with a compressor housing (11) accommodating an insert piece (12) and a diffuser (13), in which the insert piece (12) delimits a flow duct leading to the moving blades of the rotor and the diffuser (13) a flow duct leading away from the moving blades of the rotor at least in sections, and in which the diffuser (13) is designed as bladeless diffuser and as an integral part of the insert piece (12).

13 Claims, 1 Drawing Sheet

(56) References Cited

U.S. PATENT DOCUMENTS

| | | | |
|---|---|---|---|
| 8,070,416 B2 * | 12/2011 | Gottemoller | F04D 29/464 |
| | | | 415/127 |
| 2010/0192570 A1 * | 8/2010 | Schlienger | F04D 27/0292 |
| | | | 60/605.1 |
| 2012/0183395 A1 * | 7/2012 | Komor | F04D 29/444 |
| | | | 415/208.1 |
| 2016/0245304 A1 * | 8/2016 | Miyoshi | F04D 29/441 |

* cited by examiner

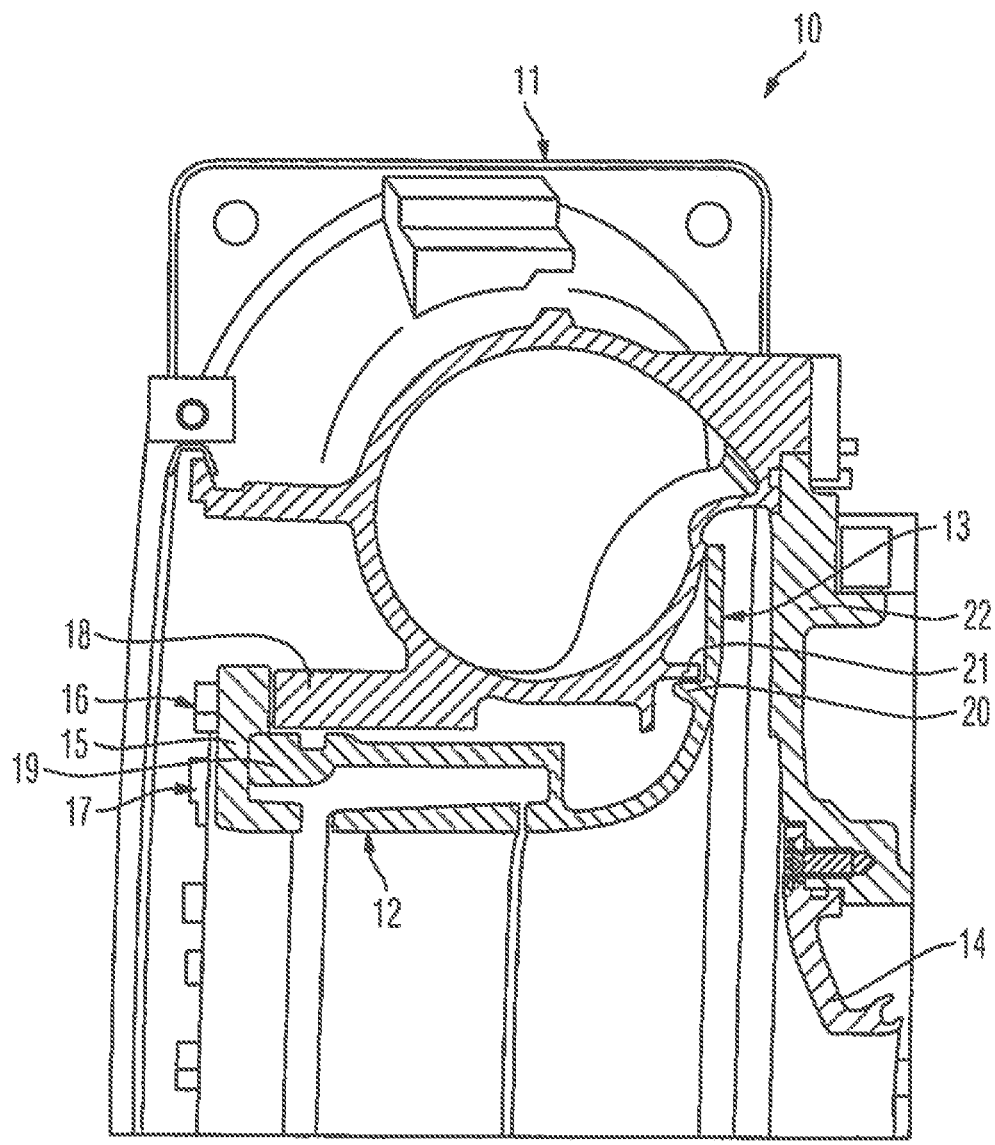

RADIAL COMPRESSOR AND TURBOCHARGER

BACKGROUND OF THE INVENTION

1. Field of the Invention

The present invention relates to a radial compressor of a turbocharger and to a turbocharger having a radial compressor.

2. Description of the Related Art

Turbochargers are equipped with a compressor and a turbine. In the turbine of a turbocharger, a first medium is expanded, wherein energy extracted in the process is utilized in the compressor of the turbocharger to compress a second medium.

A radial compressor of a turbocharger has a compressor housing and a compressor rotor. The compressor rotor of the radial compressor is subjected to axial inflow and radial outflow, wherein the compressor rotor carries moving blades. The compressor housing accommodates an insert piece and a diffuser. The insert piece at least partially delimits a flow duct leading to the moving blades of the rotor, and the diffuser delimits a flow duct leading away from the moving blades of the rotor, at least in sections.

European Patent Publication No. EP 1340920 discloses a radial compressor with a diffuser in which the diffuser of the radial compressor comprises guide blades.

SUMMARY OF THE INVENTION

The present invention creates a new type of radial compressor and a turbocharger having such a radial compressor.

According to the present invention, the diffuser is designed as a bladeless diffuser and as integral part of the insert piece.

In the radial compressor of the present invention, the diffuser is designed as bladeless diffuser. This bladeless diffuser is an integral part of the insert piece. By way of a bladeless diffuser, a deviating advantageous compressor characteristics map can be adjusted compared with a bladed diffuser. By embodying such a bladeless diffuser as an integral part of the insert piece, no separate attachment of the diffuser on the compressor housing is required, and the integral unit, consisting of diffuser and insert piece can be easily and reliably mounted on the compressor housing. A gap between insert piece, and the diffuser that existed previously can be eliminated, as a result of which flow control can be positively influenced.

According to an advantageous further development, the integral unit consisting of the diffuser and the insert piece is attached to the compressor housing. Preferably, the integral unit, consisting of the diffuser and the insert piece, is screwed to the compressor housing via a retaining ring. The attachment of the integral unit, consisting of diffuser and insert piece via a retaining ring screwed to the compressor housing, is particularly preferred since it is simple in design and reliable.

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims. It should be further understood that the drawing is not necessarily drawn to scale and that, unless otherwise indicated, it is merely intended to conceptually illustrate the structures described herein.

BRIEF DESCRIPTION OF THE DRAWING

The FIGURE shows an axial section through a radial compressor.

DETAILED DESCRIPTION OF THE PRESENTLY PREFERRED EMBODIMENTS

The present invention relates to a radial compressor and to a turbocharger having a radial compressor.

The fundamental structure of a turbocharger comprises a compressor and a turbine. In the turbine of the turbocharger, a first medium, in particular exhaust gas, is expanded and energy is extracted in the process. The energy extracted during the expansion of the first medium of the turbine is utilized in the compressor of the turbocharger to compress a second medium, in particular charge air.

The present invention relates to such a turbocharger and to a radial compressor for such a turbocharger, wherein a radial compressor is subjected to the inflow in an axial direction of the medium to be compressed and to the outflow in a radial direction of the compressed medium.

Referring to the FIGURE, the turbine of a turbocharger comprises a turbine rotor and a turbine housing. The compressor, mainly the radial compressor 10, has a compressor housing 11 and a compressor rotor coupled to the turbine rotor via a shaft. The shaft is mounted in a bearing housing 22, which is connected to the turbine housing of the turbine and to the compressor housing 11 of the radial compressor 10.

The FIGURE shows a schematic cross section through stator-side assemblies of a radial compressor 10. The FIGURE shows a compressor housing 11 of the radial compressor 10 and assemblies accommodated in the compressor housing 11 of the radial compressor 10, for example an insert piece 12, a diffuser 13 and a sealing lid 14. The compressor rotor with its moving blades is not shown in the FIGURE.

The insert piece 12 delimits a flow duct leading to the moving blades of the rotor, which is not shown, and the diffuser 13 delimits a flow duct leading away from the moving blades of the rotor, which is not shown, at least in sections in each case.

In the radial compressor 10 according to the present invention, the diffuser 13 is designed as a bladeless diffuser and embodied as an integral part of the insert piece 12. Diffuser 13 and insert piece 12 accordingly form a monolithic, one-piece assembly.

The integral unit or monolithic assembly consisting of the diffuser 13 and the insert piece 12 is attached to the compressor housing 11. In particular, the integral unit or monolithic assembly consisting of the diffuser 13 and the insert piece 12 is preferably screwed to the compressor housing 11, preferably via a retaining ring 15.

The screwing of the monolithic unit or the one-piece assembly consisting of retaining ring 12 and diffuser 13 to the compressor housing 11 is effected in such a manner that the retaining ring 15 is individually screwed via first screws 16 to the compressor housing 11, namely to a flange 18 of the compressor housing 11, and via second screws 17 to the integral unit consisting of diffuser 13 and insert piece 12, namely to a flange 19 of this integral unit.

As shown in the FIGURE, the retaining ring 15 is positioned on a flow inlet-side section of the compressor housing 11 or of the integral unit consisting of insert piece 12 and diffuser 13, so that the flange 19, via which the insert piece 15 is attached to the integral unit with the screws 17, has to be assigned to the insert piece 12.

As shown in the FIGURE, a stop 20 is formed in the region of the diffuser 13, which comes to lie against a corresponding stop 21 of the compressor housing 11 and serves for centring the integral or monolithic unit consisting of diffuser 13 and insert piece 12 in the compressor housing 11.

In the radial compressor 10 of the present invention, the diffuser 13 accordingly is bladeless and an integral part of the insert piece 12. Because the diffuser 13 is bladeless, the diffuser 13 has no contact with the bearing housing 22 and can thus not be clamped or mounted on the bearing housing 22. In order to omit individually screwing the diffuser 13 to the compressor housing 11, the bladeless diffuser 13 is an integral part of the insert piece 12. By joining bladeless diffuser 13 and insert piece 12, no separate fixing of the bladeless diffuser 13 in the compressor housing 11 is thus required. The diffuser 13 is mounted, preferably screwed, to the compressor housing 11 together with the insert piece 12. Disadvantageous gaps and steps in a transition region between insert piece 12 and diffuser 13 that are present according to prior devices are eliminated, as a result of which the flow control of the compressor 10 is improved, so that ultimately the flow can be stabilized and the effectiveness of the radial compressor 10 increased.

Thus, while there have shown and described and pointed out fundamental novel features of the invention as applied to a preferred embodiment thereof, it will be understood that various omissions and substitutions and changes in the form and details of the device illustrated, and in its operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A radial compressor having a compressor rotor with moving blades, comprising:
    a compressor housing;
    an insert piece mounted within the compressor housing;
    a diffuser mounted within the compressor housing; and
    a separate retaining ring configured to attach an integral unit to the compressor housing comprising at least the insert piece;
    wherein the insert piece and the retaining ring delimit a flow duct leading to the moving blades of the compressor rotor,
    wherein the diffuser delimits a flow duct leading away from the moving blades of the rotor,
    wherein the diffuser is a bladeless diffuser and an integral part of the insert piece.

2. The radial compressor of claim 1, wherein the diffuser is part of the integral unit attached to the compressor housing.

3. The radial compressor of claim 2, wherein the retaining ring, on a flow inlet side, is connected to a flange of the integral unit and to a flange of the compressor housing.

4. The radial compressor of claim 2, wherein the retaining ring is screwed to the integral unit and to the compressor housing.

5. The radial compressor of claim 3, wherein the retaining ring is screwed to the integral unit and to the compressor housing.

6. The radial compressor of claim 4, wherein the retaining ring is screwed to the integral unit and to the compressor housing via separate screws.

7. The radial compressor of claim 5, wherein the retaining ring is screwed to the integral unit and to the compressor housing via separate screws.

8. A turbocharger having a turbine for expanding a first medium, the turbine having a turbine housing in which is mounted a turbine rotor, the turbocharger having the radial compressor of claim 1 for compressing a second medium utilizing energy extracted in the turbine during the expansion of the first medium.

9. A turbocharger having a turbine for expanding a first medium, the turbine having a turbine housing in which is mounted a turbine rotor, the turbocharger having the radial compressor of claim 2 for compressing a second medium utilizing energy extracted in the turbine during the expansion of the first medium.

10. The turbocharger of claim 8, wherein the compressor rotor of the radial compressor is coupled to the turbine rotor via a shaft, and wherein the turbine housing and the compressor housing are each connected to a bearing housing arranged between the turbine housing and the compressor housing, the shaft being mounted in the bearing housing.

11. The radial compressor of claim 2, wherein the retaining ring is arranged at an inlet portion of the flow duct leading to the moving blades of the compressor rotor.

12. The radial compressor of claim 7, wherein the separate screws are arranged parallel to a longitudinal axis of the compressor rotor.

13. The radial compressor of claim 1, further comprising:
    a stop formed in a region of the diffuser opposite the retaining ring;
    a corresponding stop of the compressor housing against which the stop formed in the region of the diffuser lies against,
    wherein the stops are configured to center at least the diffuser in the compressor housing.

* * * * *